United States Patent [19]
Pehm

[11] Patent Number: 4,916,846
[45] Date of Patent: Apr. 17, 1990

[54] ILLUMINATED FISHING BOBBER

[76] Inventor: Joseph K. Pehm, 6636 W. Coolidge, Phoenix, Ariz. 85033

[21] Appl. No.: 370,858

[22] Filed: Jun. 23, 1989

[51] Int. Cl.$^4$ ............................................. A01K 13/00
[52] U.S. Cl. .................................................... 43/17.5
[58] Field of Search .................................. 43/17, 17.5

[56] References Cited

U.S. PATENT DOCUMENTS

| | | | |
|---|---|---|---|
| 1,175,968 | 3/1916 | Meiners | 43/17 |
| 3,656,251 | 4/1972 | Snider et al. | 43/17 |
| 3,739,513 | 6/1973 | Durham, Jr. | 43/17 |
| 4,109,404 | 8/1978 | Preeschl | 43/17 |
| 4,157,627 | 7/1979 | Tschelisnik | 43/17 |
| 4,461,114 | 7/1984 | Riead | 43/17.5 |
| 4,486,969 | 12/1984 | Swenson | 43/17 |
| 4,601,126 | 7/1986 | Klocksiem | 43/17.5 |

FOREIGN PATENT DOCUMENTS 1494496  12/1977  United Kingdom .................... 43/17

Primary Examiner—Richard K. Seidel
Assistant Examiner—James Miner
Attorney, Agent, or Firm—Jerry T. Kearns

[57] ABSTRACT

An illuminated fishing bobber is formed from two threadably connected hemispherical shells. A transparent dimple adjacent one end of the body member houses a light and a conical reflector. A counter weight in the body member causes the dimple to be disposed in a normally inverted orientation when the bobber is floating in a body of water. An eyelet on the dimple is provided for securement to a line from a conventional fishing pole. A rotational spool of line in the body member contains an adjustable drag mechanism for exerting an adjustable tension on the line. A free end of line from the spool passes through an aperture diametrically opposite the dimple for connection to an external hook. Upon a fish strike, the bobber is turned to an upright orientation which causes a battery to be connected to the light by virtue of a position sensitive switch. A hinged brake arm is used to lock a stationary rim of the spool within the body member.

15 Claims, 4 Drawing Sheets

ILLUMINATED FISHING BOBBER

BACKGROUND OF THE INVENTION

1. Field of the Invention

The present invention relates to illuminated fishing bobbers, and more particularly pertains to an illuminated fishing bobber which provides an indication of a fishing strike by energizing an electric light. While various types of fish strike indicating devices are known in the prior art, these devices do not allow compensation of a drag tension on a line connected to an external hook. Hence these devices are susceptible to erroneous activation in rough water. In order to overcome this problem, the present invention provides an illuminated fishing bobber which includes a battery connectable to an electric light by a position sensitive switch and having an internal spool of line with an adjustable drag and a spring retraction mechanism.

2. Description of the Prior Art

Various types of illuminated fishing bobbers are known in the prior art. A typical example of such a bobber is to be found in U.S. Pat. No. 3,656,251, which issued to A. Snider et al., on Apr. 18, 1972. This patent discloses an electric fish catch indicator adapted to be connected to a fisherman's line comprising a tubular housing containing a battery, a lamp and a removable switch assembly. The switch assembly includes an arc-shaped flexible electrode, fixed switch contact surfaces, and a contact electrode movable against spring bias into contact with the fixed surfaces by a pole on a stem secured to the movable electrode to close the electrical circuit. A fishing rod with a hook thereon is secured to the end of the stem extending outwardly of the housing and a pole on the line by a fish strike will actuate the switch to close the circuit and light the lamp. U.S. Pat. No. 3,739,513, which issued to G. Durham Jr. on June 1973, discloses a fishing float associated with a fishing line comprising a hollow body in which a battery, a bulb, and a shaft are disposed. The shaft is formed at its interior end as a spiral spring which encloses a marginal end of the battery and engages the bulb in a manner to space the end of the bulb from the battery. The other end of the shaft extends to a seal member to the exterior of the float and has an eyelet for connection with a fishing line. A pull on the line moves the shaft to force the bulb into contact with the battery to light the bulb and simulate a fish strike. U.S. Pat. No. 4,109,404, which issued to R. Preeschl on Aug. 29, 1978, discloses a fishing bobber having an inflated resilient spherical housing with a diametrically extending passageway for threading through a fishing line. An electrically energized signal device within the housing is activated upon compressional distortion of the housing by an incremental pulling stress exerted upon the line by a fish strike. U.S. Pat. No. 4,157,627, which issued to R. Tschelisnik on June 12, 1979, discloses an electrically conducted floating body having a slightly higher specific weight than that of water which is carried within the immersed lower end of a tubular hollow float coupled to one end of a fishing line such that the fish in submerging the hollow float causes the electrically conducted floating body to close contacts between a battery and an illuminating diode carried by the hollow float above the surface of the water. U.S. Pat. No. 4,486,969, which issued to P. Swenson on Dec. 11, 1984, discloses a bobber including an electrical circuit having a position sensitive switch that is activated when the bobber is rotated about its center of gravity into the striking of a fish. The battery in the bobber serves as a ballast to normally hold the bobber in upright position.

While the above mentioned devices are directed to illuminated fishing bobbers, none of these devices discloses an illuminated bobber having a rotational line spool with an adjustable drag for compensation to various fishing conditions. Inasmuch as the art is relatively crowded with respect to these various types of illuminated fishing bobbers, it can be appreciated that there is a continuing need for and interest in improvements to such illuminated fishing bobbers, and in this respect, the present invention addresses this need and interest.

SUMMARY OF THE INVENTION

In view of the foregoing disadvantages inherent in the known types of illuminated fishing bobbers now present in the prior art, the present invention provides an improved illuminated fishing bobber. As such, the general purpose of the present invention, which will be described subsequently in greater detail, is to provide a new and improved illuminated fishing bobber which has all the advantages of the prior art illuminated fishing bobbers and none of the disadvantages.

To attain this, a representative embodiment of the concepts of the present invention is illustrated in the drawings and makes use of an illuminated fishing bobber formed from two threadably connected hemispherical shells. A transparent dimple adjacent one end of the body member houses a light and a conical reflector. A counter weight in the body member causes the dimple to be disposed in a normally inverted orientation when the bobber is floating in a body of water. An eyelet on the dimple is provided for securement to a line from a conventional fishing pole. A rotational spool of line in the body member contains an adjustable drag mechanism for exerting an adjustable tension on the line. A free end of line from the spool passes through an aperture diametrically opposite the dimple for connection to an external hook. Upon a fish strike, the bobber is turned to an upright orientation which causes a battery to be connected to the light by virtue of a position sensitive switch. A hinged brake arm is used to lock a stationary rim of the spool within the body member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated fishing bobber which has all the advantages of the prior art illuminated fishing bobbers and none of the disadvantages.

It is another object of the present invention to provide a new and improved illuminated fishing bobber which may be easily and efficiently manufactured and marketed.

It is a further object of the present invention to provide a new and improved illuminated fishing bobber which is of a durable and reliable construction.

An even further object of the present invention is to provide a new and improved illuminated fishing bobber which is susceptible of a low cost of manufacture with regard to both materials and labor, and which accordingly is then susceptible of low prices of sale to the consuming public, thereby making such illuminated fishing bobbers economically available to the buying public.

Still yet another object of the present invention is to provide a new and improved illuminated fishing bobber which provides in the apparatuses and methods of the prior art some of the advantages thereof, while simultaneously overcoming some of the disadvantages normally associated therewith.

Still another object of the present invention is to provide a new and improved illuminated fishing bobber for providing a visual indication of a fish strike on a fisherman's line.

Yet another object of the present invention is to provide a new and improved illuminated fishing bobber which is adjustable to various fishing conditions to minimize false indications.

Even still another object of the present invention is to provide a new and improved illuminated fishing bobber which includes a rotational line spool having a spring line retraction and an adjustable drag tension.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
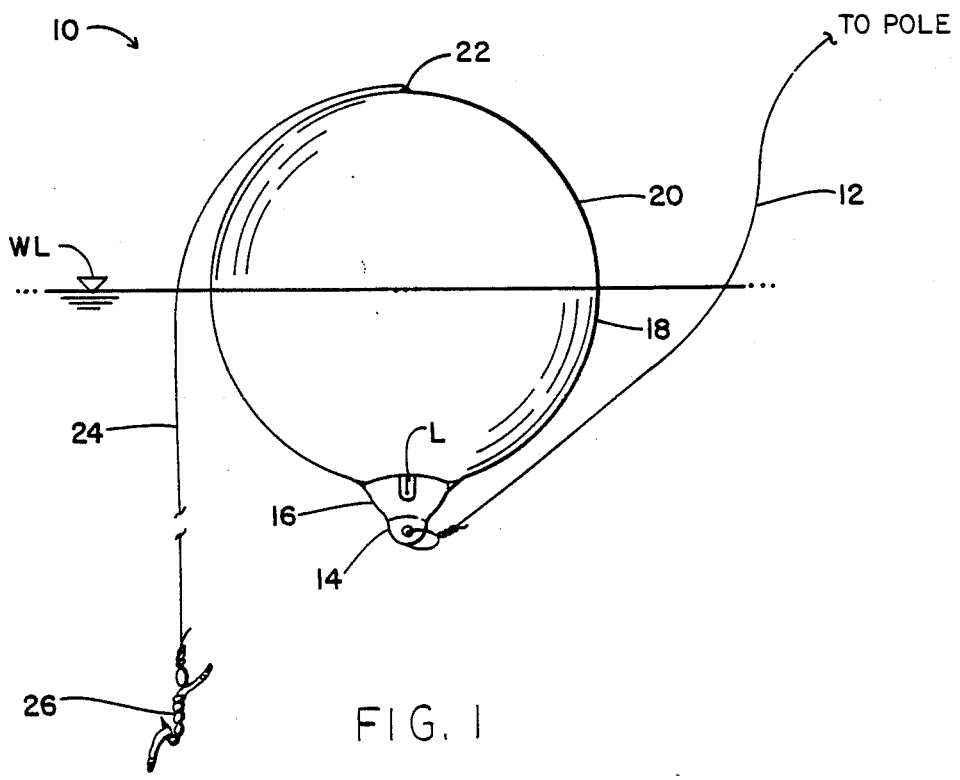
FIG. 1 is a side elevational view illustrating the illuminated bobber of the present invention in use prior to a fish strike.

With reference now to the drawings, and in particular to FIG. 1 thereof, a new and improved illuminated fishing bobber embodying the principles and concepts of the present invention and generally designated by the reference numeral 10 will be described.

More specifically, it will be noted that the first embodiment 10 of the invention includes a hollow body member formed by two hemispherical shells 18 and 20. A transparent dimple 16 is formed at one end of the body member and encloses an electric light or lamp L. An eyelet is formed on the dimple 16 for connection to a fishing line 12 from a conventional fishing pole. An aperture 22 is formed diametrically opposite the dimple 16 and receives a line 24 from an internal spool within the bobber. The line 24 is connected to an external fishing hook 26. As illustrated, the bobber 10 normally floats in an orientation which causes the dimple 16 to be submerged below the water line WL.

Figure 2:
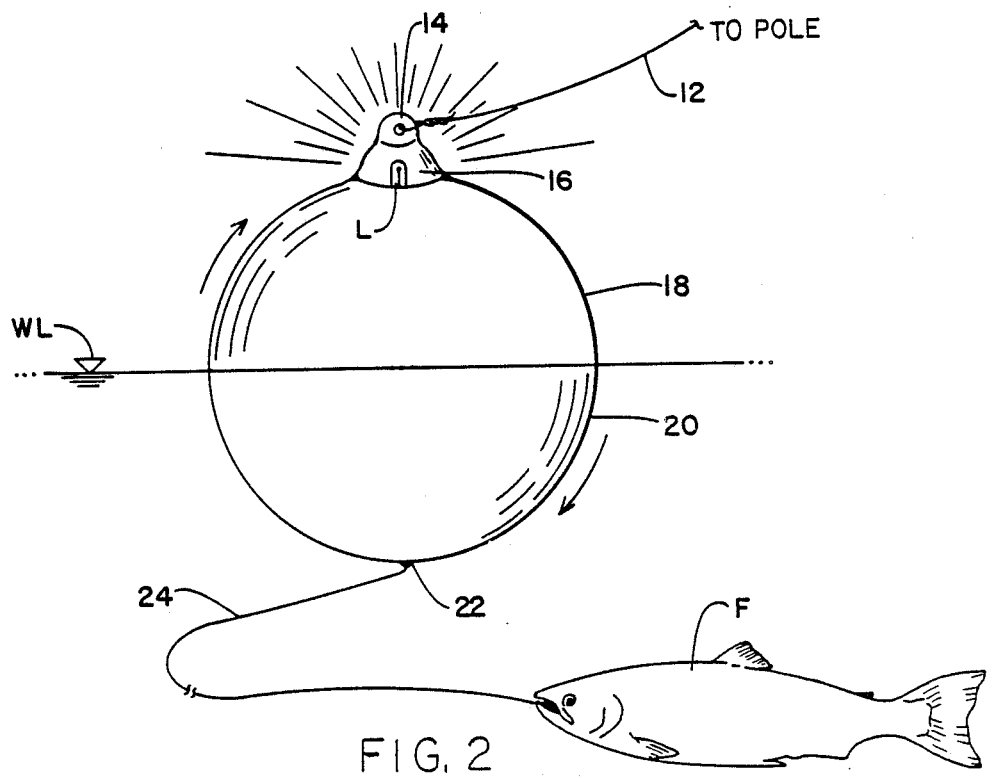
FIG. 2 is a side elevational view illustrating the bobber in an activated condition subsequent to a fish strike.

As shown in FIG. 2, a strike on the fishing hook secured to the line 24 by a fish F causes the bobber to rotate to an upright orientation in which the transparent dimple 16 is disposed above the water line WL. An internal electrically actuated position sensitive switch, for example a mercury switch, connects an internal battery with the lamp L, causing a visual indication of a fishing strike.

Figures 3, 4:
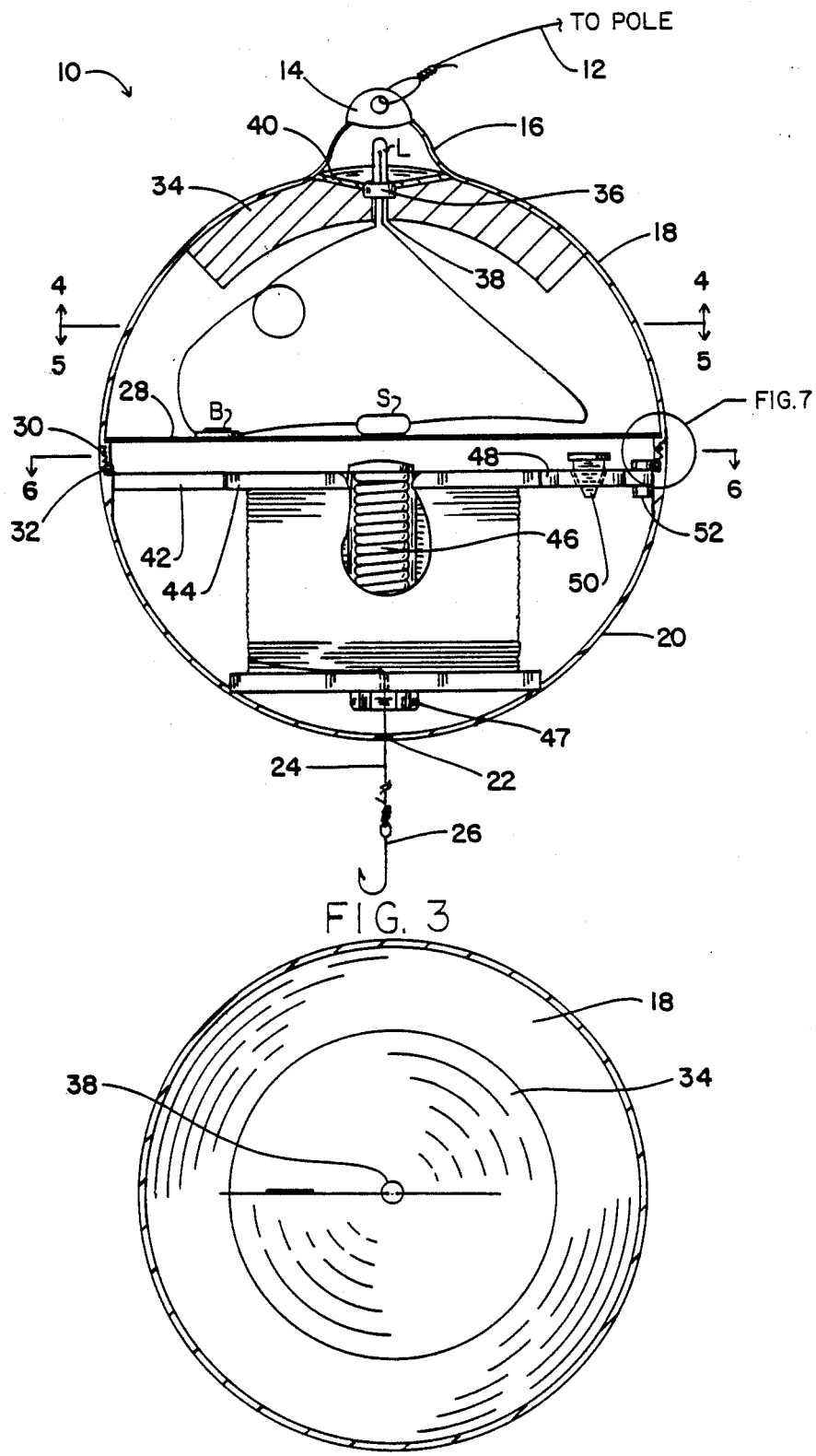
FIG. 3 is a cross sectional view illustrating the construction of the bobber.
FIG. 4 is a transverse cross sectional view, taken along line 4—4 of FIG. 3.

FIG. 3 illustrates a cross sectional view of the bobber 10. A mounting plate 28 is received on an internal annular ledge within the shell 18 and supports a position sensitive switch S and a battery B which are connected in circuit with the lamp L. The lamp L is disposed in an electric socket 36 centrally located in a frusto conical reflector 40. An aperture 38 is formed through a counter weight member 34 for allowing replacement of the lamp L. A threaded connection 30 is provided between the hemispherical shells 15 and 20 and includes an O-ring 32 to provide a watertight seal. A circular plate 42 is stationarily disposed within the shell 20 and receives a stationary circular rim 44 of a fishing line spool. The spool is preferably of the type which includes an internal spring retraction mechanism 46 and an adjustable drag mechanism 47. The details of these mechanisms may be of the type utilized in conventional fly fishing reels. A braking arm 48 mounted by a hinge 52 is urged into locking frictional engagement with the stationary rim 44 of the spool by a frusto conical screw 50. Thus, by adjustment of the drag mechanism 47, the tension on the line 24 may be regulated in order to compensate for rough water or strong current conditions which would ordinarily cause an inversion of the bobber and result in a false fish strike indication.

FIG. 4 is transverse cross sectional view, taken along line 4—4 of FIG. 3 which illustrates the configuration of the counter weight 34.

Figure 5:
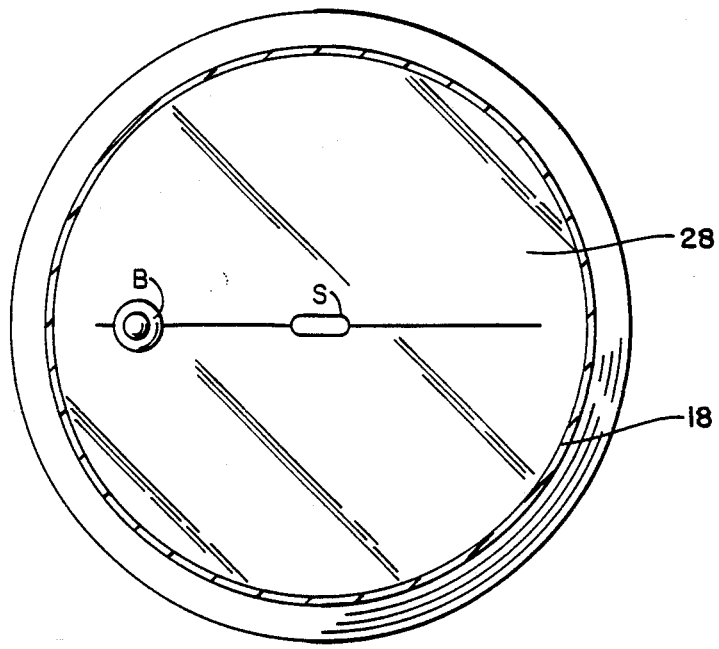
FIG. 5 is a transverse cross sectional view, taken along line 5—5 of FIG. 3.

FIG. 5 is a cross sectional view, taken along line 5—5 of FIG. 3 which illustrates the mounting plate 28, the switch S and the battery B.

Figure 6:
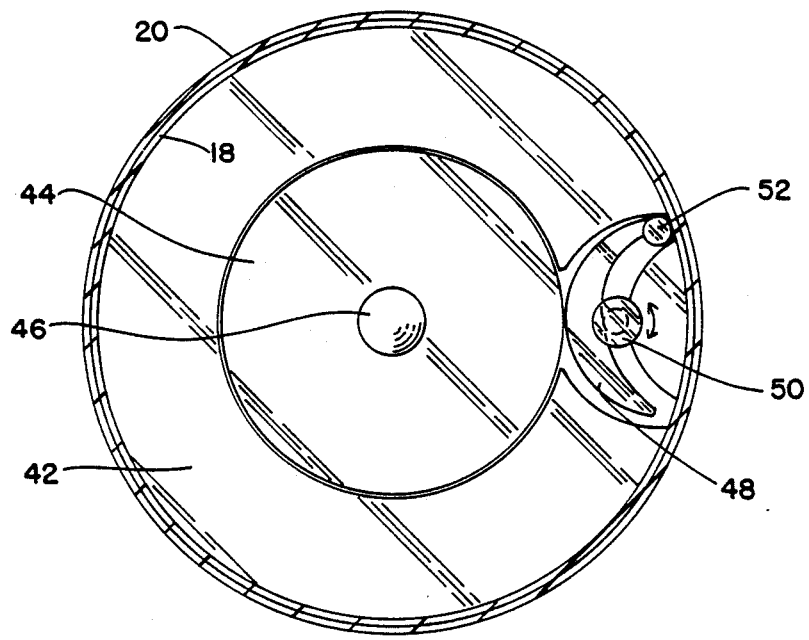
FIG. 6 is a transverse cross sectional view, taken along line 6—6 of FIG. 3.

FIG. 6 is a cross sectional view, taken along line 6—6 of FIG. 3 which illustrates the arcuate braking arm 48 mounted by the hinge 52 and urged by the conical screw 50 against the stationary rim of the spool 44. This locks the rim of the spool in a stationary position within an aperture formed through the plate 42. When it is desired to remove the spool, or manually rotate the spool to rewind the line, the screw 50 is loosened to disengage the brake arm 48 from the rim 44. It should be noted that ordinarily the rim 44 will be locked against rotational movement, causing the center rotationally mounted spindle of the spool 46 to rotate to play out line from the spool. As previously described, the spool 44 is preferably of the conventional type utilized in fly fishing reels in which a spring retraction mechanism is operative upon actuation of a manual button to rewind line which has been played out. The spool also preferably includes an adjustable drag mechanism to regulate the tension on the line.

Figure 7:
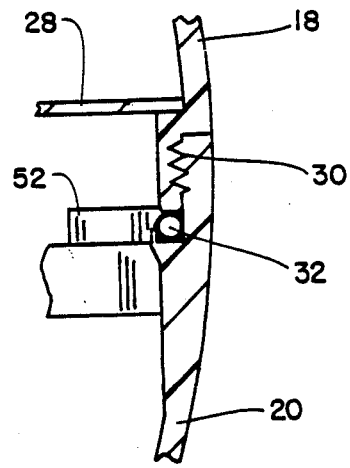
FIG. 7 is an enlarged detail view illustrating the threaded sealed connection between the two hemispherical shells of the bobber.

FIG. 7 is an enlarged cross sectional detail view which illustrates the threaded connection 30 between the hemispherical shells 18 and 20, which includes a sealing O-ring 32.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated fishing bobber, comprising:
   a hollow body member;
   a light in said body member;
   a battery in said body member;
   a position sensitive switch in said body member for connecting said battery to energize said light;
   eyelet means for securing a fishing line from a fishing rod to said body member;
   a rotationally mounted spool of line in said body member; and
   an aperture receiving an end of said line on said spool for connection to an external hook.

2. The illuminated fishing bobber of claim 1, further comprising a counter weight in said body member for causing said body member to float in a normally inverted orientation and allowing said body member to turn to an upright position upon a fish strike on said external hook.

3. The illuminated fishing bobber of claim 2, wherein said eyelet means is disposed adjacent a first end of said body member and said aperture is disposed adjacent an opposite end of said body member.

4. The illuminated fishing bobber of claim 1, wherein said body member is generally spherical.

5. The illuminated fishing bobber of claim 2, wherein said body member is generally spherical.

6. The illuminated fishing bobber of claim 3, wherein said body member is generally spherical.

7. The illuminated fishing bobber of claim 1, further comprising drag means in said spool for applying an adjustable tension on said line.

8. The illuminated fishing bobber of claim 7, further comprising a hinged brake arm ad a conical screw for biasing said brake arm against a rim of said spool.

9. The illuminated fishing bobber of claim 1, wherein said spool has a rewind retraction spring to rewind said line.

10. An illuminated fishing bobber, comprising:
    a generally spherical hollow body member;
    a transparent dimple formed adjacent one end of said body member;
    a light in said dimple;
    a counter weight in said body member secured adjacent said dimple for causing said body member to float in an orientation in which said dimple is normally submerged;
    means for securing a line from a fishing pole adjacent said dimple;
    a rotational spool of line in said body, a free end of said line extending to an aperture in said body opposite said dimple for connection to an external hook;
    battery means in said body member; and
    position sensitive switch means in said body member operably connected for energizing said light upon inversion of said body member by a fish strike on said external hook.

11. The illuminated fishing bobber of claim 10, wherein said body member is formed by two removably connected hemispherical shells.

12. The illuminated fishing bobber of claim 10, further comprising drag means in said spool for applying an adjustable tension on said line.

13. The illuminated fishing bobber of claim 12, further comprising a hinged brake arm and a conical screw for biasing said brake arm against a rim of said spool.

14. The illuminated fishing bobber of claim 10, wherein said spool has a rewind retraction spring to rewind said line.

15. An illuminated fishing bobber, comprising:
    a generally spherical hollow body member formed by two removably connected hemispherical shells;
    a transparent dimple adjacent one end of said body member;
    a light in said dimple;
    a counter weight in said body member secured adjacent said dimple for causing said body member to float in an orientation in which said dimple is normally submerged;
    a frusto conical reflector in said dimple surrounding said light;
    an eyelet on said dimple for securing a line from a fishing pole;

a battery in said body member;

a position sensitive switch in said body member for connecting said battery to said light;

a spring retracted rotational spool of line in said body, drag means in said spool for exerting an adjustable tension on said line, a free end of said line extending through an aperture in said body member disposed diametrically opposite said dimple;

a hinge brake arm in said body member disposed to exert a locking force on a rim of said spool; and a conical screw for urging said brake arm against said spool.

* * * * *